United States Patent [19]

Kanij et al.

[11] E Re. 28,894

[45] Reissued July 6, 1976

[54] METHOD FOR THE PREPARATION OF CONCENTRATED ANION-DEFICIENT SALT SOLUTIONS

[75] Inventors: Johannes B. W. Kanij, Zevenaar; Arend J. Noothout, Oosterbeek; Marie E. A. Hermans, Arnhem, all of Netherlands

[73] Assignee: Reactor Centrum Nederland, The Hague, Netherlands

[22] Filed: June 16, 1975

[21] Appl. No.: 587,209

Related U.S. Patent Documents

Reissue of:

[64] Patent No.: 3,838,062
Issued: Sept. 24, 1974
Appl. No.: 283,291
Filed: Aug. 24, 1972

U.S. Applications:

[62] Division of Ser. No. 106,922, Jan. 15, 1971, abandoned.

[30] Foreign Application Priority Data

Jan. 16, 1970 Netherlands ..... 7000674
Jan. 8, 1971 Australia ..... 24159/71

[52] U.S. Cl. ..... 252/301.1; 423/251; 423/260

[51] Int. Cl.[2] ..... C01G 43/00

[58] Field of Search ..... 252/301.1 R, 301.1 S

[56] References Cited

UNITED STATES PATENTS

| | | | |
|---|---|---|---|
| 3,171,715 | 3/1965 | Kleinsteuber | 252/301.1 S |
| 3,307,772 | 7/1967 | Fitch et al. | 252/301.1 S |
| 3,361,676 | 1/1968 | McBride et al. | 252/301.1 S |
| 3,401,122 | 9/1968 | Cogliati et al. | 252/301.1 S |

*Primary Examiner*—Leland A. Sebastian
*Attorney, Agent, or Firm*—Cushman, Darby & Cushman

[57] ABSTRACT

Concentrated anion-deficient salt solutions are prepared of the actinide oxides, $PuO_2$, $UO_2$, $UO_3$ and $U_3O_8$ by dissolving one or more oxides in an aqueous solution of thorium nitrate at a concentration of 4 molar or greater and at a temperature of 60° C. or more. Anion-deficient salt solutions of actinide metals so produced are useful as starting materials for the manufacture of ceramic nuclear fuel particles by the sol-gel process.

2 Claims, No Drawings

METHOD FOR THE PREPARATION OF CONCENTRATED ANION-DEFICIENT SALT SOLUTIONS

Matter enclosed in heavy brackets [ ] appears in the original patent but forms no part of this reissue specification; matter printed in italics indicates the additions made by reissue.

This is a division of application Ser. No. 106,922, filed Jan. 15, 1971, now abandoned.

BACKGROUND OF THE INVENTION

The invention relates to the preparation of concentrated anion-deficient salt solutions.

Anion-deficient salt solutions are for instance suitable for the preparation of solid oxide and carbide particles.

For the preparation of spherical particles of ceramic nuclear fuel an anion-deficient solution of uranylnitrate can successfully be used as a starting material.

In the prior art these solutions have been prepared according to the following methods:

(1) By dissolving $UO_3$ in concentrated uranyl nitrate solutions, (2) By the extraction of nitric acid from stoichiometric, possibly slightly acid uranyl nitrate solutions.

These methods show, however, the following drawbacks.

For the purpose of the first method it is necessary to have at one's disposal a $UO_3$ of such a texture that this substance easily dissolves in the uranyl nitrate solution.

As to the second method it is observed that extraction, whereby nitric acid is withdrawn from a stoichiometric or weakly acid uranyl nitrate solution, can only be applied to dilute uranyl nitrate solutions. Moreover, a special installation is needed for this. After removal of the nitric acid the solution obtained has to be brought to the required degree of concentration, e.g. by evaporation.

The invention aims at giving improved methods for the preparation of an anion-deficient uranyl nitrate solution. Besides it appeared that anion-deficient actinide salt-solutions could be prepared according to several more methods than was formerly possible.

DETAILED DESCRIPTION OF THE INVENTION

According to the invention one or more actinide oxides as $PuO_2$, $UO_3$ or lower uranium oxides than $UO_3$ are dissolved in a small volume of an acid reacting liquid. The acid reacting liquid consists of a small amount of a strong acid such as a small amount of concentrated $HNO_3$, HCl or $H_2SO_4$ or an aqueous solution of an actinide salt of a strong acid as for instance $UO_2(NO_3)_2$ or $Th(NO_3)_4$.

Mixtures of the above-mentioned liquids can be used too.

With a small amount of liquid is meant that in case of an anion-deficient uranyl nitrate solution the uranium concentration is at least 2 molar.

It is possible to incorporate during the preparation or thereafter small amounts of compounds of other elements in the anion-deficient actinide salt solution in order to improve the properties of nuclear fuel material prepared from this solution.

By other compounds are meant water soluble boron, yttrium, rare earth metals and zirconium compounds.

Examples of the preparation of mixed anion-deficient actinide salt solutions are the dissolving of $PuO_2$ in uranyl nitrate solution and of $UO_3$ in thorium nitrate solution.

It has surprisingly been found that anion-deficient solutions of the required nitrate/actinide metal ratio can be obtained by causing lower oxides than $UO_3$ to react with strong nitric acid, uranyl nitrate solution, thorium nitrate solution or mixtures of these substances in the quantities calculated on the basis of the requirements.

The use of lower uranium oxides than $UO_3$ has the advantage of better solubility in acid solutions than $UO_3$. The difficulty of preparing a $UO_3$ with a suitable texture namely can be avoided.

Lower uranium oxides than $UO_3$ are the compounds $U_3O_8$ and $UO_2$. These oxides, along with uranyl nitrate, are the forms in which uranium is obtainable as a basic material. They are also the forms in which uranium is preferably conveyed.

It is therefore of importance to convert these oxides in the eaiest possible manner into the solution required for the process to be employed.

The required anion-deficient uranyl nitrate solution may be characterized as follows:

$$[U] \text{ about } 3\ M$$
$$\frac{[NO_3']}{[U]} \text{ about } 1.5$$

It is observed that this uranium concentration is higher than that of the saturated stoichiometric uranyl nitrate solution.

For the preparation of ceramic fissile material a solution of this kind is first mixed with ammonia-liberating agent and then solidified by being dispersed in a phase of sufficiently high temperature, non-miscible with water. With this method it is of great importance to start with highly concentrated uranium solutions.

In order to make the rate of solution of the uranium oxide in nitric acid as high as possible, it is important to prepare the $U_3O_8$ by heating in an oxidizing atmosphere, such as air or oxygen, at temperatures between 600° and 900° C. At these temperatures the most volatile and/or combustible impurities are removed and the texture of the material is still conducive to solution.

Difficultly soluble $UO_2$ is likewise converted by this thermal processing into easily soluble $U_3O_8$.

Very difficultly soluble $UO_2$ is converted into $U_3O_8$ by being sintered in air at 700° C. The cubic lattice of $UO_2$ is thereby changed into he othorhombic lattice of $U_3O_8$. As the molecular volume of $U_3O_8$ is greater than that of $UO_2$, since $UO_2$ is of higher density than $U_3O_8$, the particles are completely crumbled. The high specific surface areas of the $U_3O_8$ obtained in this way has the effect that it can now be readily dissolved in $HNO_3$.

The preparation of $U_3O_8$ as described above is the ideal method of utilizing waste obtained in the preparation of the ceramic fissile material. For this purpose the waste may consist either of unsintered waste material, possibly containing organic filter material, or of sintered final product composed of $UO_2$.

In accordance with the undermentioned gross equations (1) and (2), the quantities of nitric acid used can be determined by calculation.

$$2UO_2 + 5HNO_3 \longrightarrow 2[UO_2(NO_3)_{1.5}(OH)_{0.5}] + 2H_2O + NO\uparrow + NO_2\uparrow \qquad (1)$$

-continued $$2U_3O_8 + 11HNO_3 \longrightarrow 6[UO_2(NO_3)_{1.5}(OH)_{0.5}] + 4H_2O + NO\nearrow + NO_2\nearrow \quad (2)$$

The invention is further elucidated below by reference to a number of examples.

Example I deals with the preparation of an anion-deficient uranyl nitrate solution by dissolving $UO_2$ powder in nitric acid.

Example II deals with the processing of spherical particles of unsintered $UO_3$.

Example III deals with the conversion of waste material from spherical particles of $UO_2$ sintered at high temperatures.

Examples IV relates to the dissolving of $U_3O_8$ in uranyl nitrate solution.

EXAMPLE I

A solution test was carried out with natural $UO_2$ powder in nitric acid with the undermentioned quantities of $UO_2$ and $HNO_3$.

Weighed-out

| | | | |
|---|---|---|---|
| $UO_2$: | 11.4854 g. | = | 42.5 mmol of $UO_2$ |
| $HNO_3$: | 3 × 42.5 | = | 127.5 mmol of $HNO_3$. |

diluted with water to 100 ml. In this example $UO_2$ was added in portions to the hot (~80° C.) $HNO_3$ solution.

On account of the fact that during solution in an open beaker some losses of nitric acid occurred, slightly more nitric acid was used than was equivalent to equation (1).

The solution obtained was found to have an $NO_3'/U$ ratio of 1.6.

EXAMPLE II

A quantity of spherical particles of $UO_3$ was heated slowly in air to 700° C. and then kept at this temperature for another four hours. The following was obtained:

$$249.8 \text{ g. of } U_3O_8, \text{ or } \frac{349.8}{842} \cdot 1000 = 415 \text{ mmol of } U_3O_8$$

This quantity was added in portions to a heated $HNO_3$ solution consisting of 160 ml. of concentrated $HNO_3$ (14.4 M) and 258 ml. of water in a beaker. The total volume amounted to 160+258=418 ml., so that after solution the uranium concentration is about 3 M.

The $HNO_3/U_3O_8$ ratio used=2300/415≈5.5. According to the gross equation (2) an $NO_3'/U$ ratio ≤ 1.5 may be reckoned with.

Analysis of the solution obtained gave the following results:

$$\frac{[NO_3']}{[U]} = 1.44; [U] = 3.14 \text{ M};$$

density 1.965 g./cm.$^3$ (20.6° C.).

The solution tests were repeated with two quantities of spherical particles of $UO_3$ with a 20% and 40% enrichment respectively, after they had first been converted into $U_3O_8$.

The results obtained in this way are set forth below in Table A.

It was observed that by operating in a three-necked flask with a reflux cooler the nitrous vapors had reformed a quantity of $HNO_3$.

TABLE A

| Degree of enrichment | $U_3O_8$, grams | G. mol $U_3O_8$ | Ml. $HNO_3$, 14.4M | Mol $HNO_3$/mol $U_3O_8$ | $H_2O$, ml. | Density, g./cm.$^3$, 21°C. | [U] Measured | [U] Calculated | $[NO_3']/[U]$ |
|---|---|---|---|---|---|---|---|---|---|
| 20% | 770.1 | 0.917 | 350 | 5.50 | 500 | 1.866 | 2.82 | 2.82 | 1.76 |
| 40% | 622.3 | 0.743 | 270 | 5.25 | 300 | 1.904 | 2.95 | 2.97 | 1.58 |

EXAMPLE III 644.1 grams of spherical particles of $UO_2$ (sintered at 1400° C. in an atmosphere containing hydrogen), were slowly heated to 750° C. and then kept for four hours at this temperature. In this way 662.5 grams of $U_3O_8$ were obtained, which could readily be passed into solution according to the method indicated in Example II.

EXAMPLE IV

In this example a quantity of 116 g. of $UO_2(NO_3)_2 \cdot 6H_2O$ was dissolved in 72 ml. of water and then boiled under reflux with 13.7 g. of $U_3O_8$ for 2½ hours.

The clear solution obtained had a 2.49 molar content of uranium and an $NO_3'/U$ ratio of 1.62.

What is claimed is:

1. A method for preparing a concentrated anion-deficient actinide salt solution containing at least one actinide oxide selected from the group consisting of $PuO_2$, $UO_2$, $UO_3$ and $U_3O_8$, said method including dissolving at a temperature of at least 60° C., said [ salt ] *oxide* in an aqueous solution of thorium nitrate having a concentration of at least 4 molar.

2. A method for the preparation of a concentrated anion-deficient actinide nitrate solution wherein at least one member selected from the group consisting of uranium dioxide, uranium trioxide and $U_3O_8$, is dissolved by stirring in a heated thorium nitrate solution of a temperature of at least 60° C., and of a concentration of at least 4 molar, and the solution thus obtained is thereafter diluted with water.

* * * * *